GERALD L. SULLIVAN
RICHARD A. PFUNTNER
EDWARD E. LYNCH
*INVENTORS*

BY Richard E. Hosley

THEIR ATTORNEY

Sept. 19, 1961  G. L. SULLIVAN ET AL  3,000,222
GYRO APPARATUS FOR MANEUVERING CRAFT
Filed July 3, 1959  3 Sheets-Sheet 2

GERALD L. SULLIVAN
RICHARD A. PFUNTNER
EDWARD E. LYNCH
*INVENTORS*

BY *Richard E. Horley*

THEIR ATTORNEY

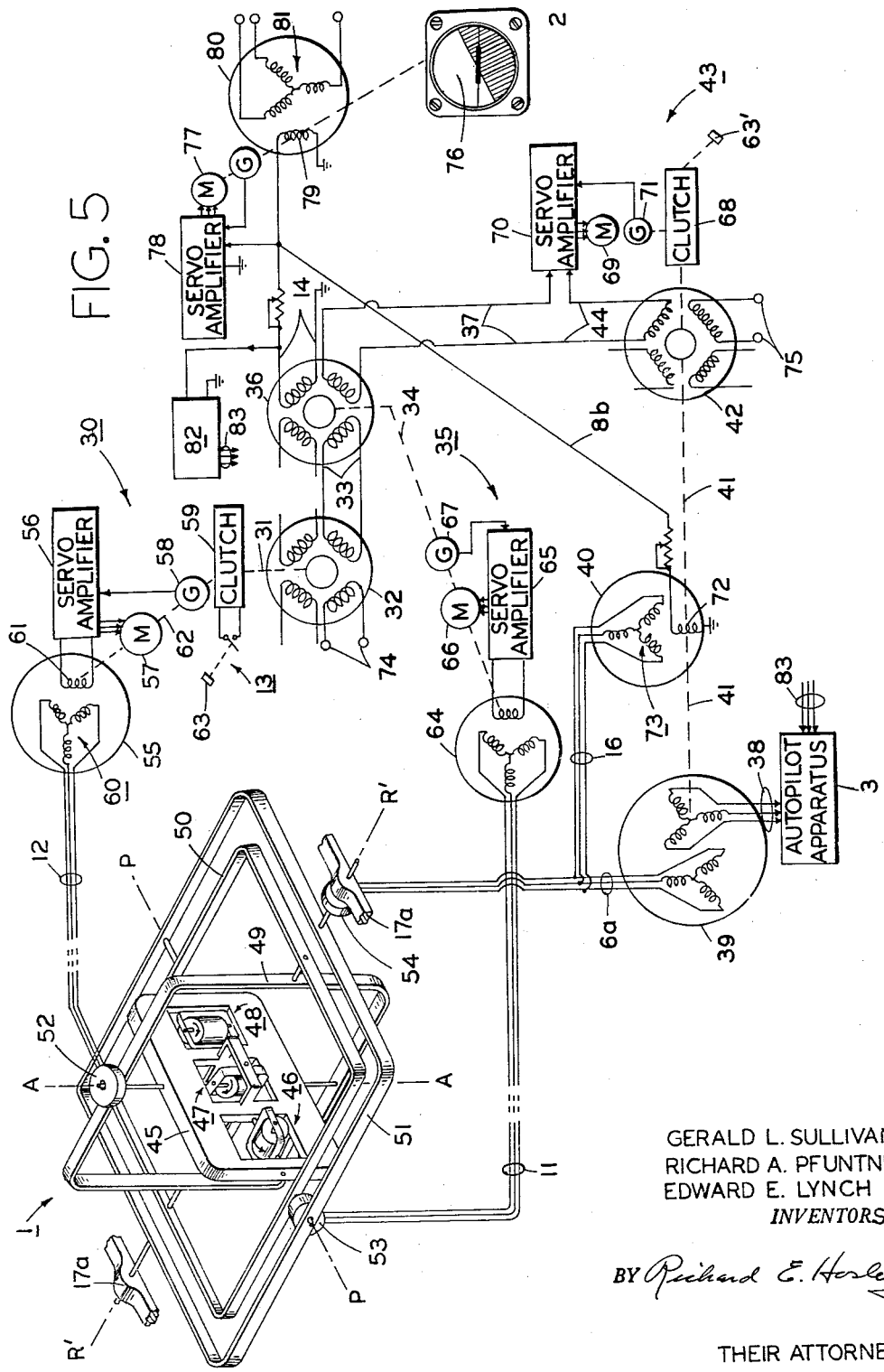

United States Patent Office 3,000,222
Patented Sept. 19, 1961

3,000,222
GYRO APPARATUS FOR MANEUVERING CRAFT
Gerald L. Sullivan, West Peabody, Richard A. Pfuntner, Lynn, and Edward E. Lynch, Wakefield, Mass., assignors to General Electric Company, a corporation of New York
Filed July 3, 1959, Ser. No. 824,859
11 Claims. (Cl. 74—5)

The present invention relates to gyroscopically controlled navigational apparatus and, in one particular aspect, to high-accuracy aircraft navigation systems in which gyro output signals developed during maneuvers are uniquely translated into improved form for craft control purposes.

Modern gyroscopes and their associated equipments may be made remarkably precise, and it might therefore be expected that their output data would continue to be of comparable reliability for indication and automatic control purposes during all craft maneuvers. As a practical matter, however, the occasions of full reliability may be found to be narrowly restricted, such as to periods of near-horizontal flight; not for the reason that the gyro develops actual errors but for the more subtle reasons that gyro gimballing arrays do not directly define the motion of the craft with respect to the coordinate axes of the craft. A typical three-gyro four-gimballed platform affords a good illustration of the confusion which can result from this. Its heading, angle of elevation, and roll data are taken about gimbal axes which produce measurements of the attitude of the craft in relation to the earth as needed for navigational purposes. The data are also valid for control purposes when the craft is in or near horizontal flight; however, craft maneuvers performed when the gimbal axes are displaced from their normal positions tend to develop relative orientations of the gimbals and platform which as stated above, do not measure motions of the craft about its own coordinate axes. Inasmuch as the latter relative motions are those sought to be identified for control purposes, the control and indication responsive to the gimbal angle measurements can become faulty, and potentially hazardous. One "brute force" approach to minimizing such defects involves the use of further separate gyroscope equipment, such as gyroscope assemblies aligned with the craft axes, which respond to incremental changes in attitudes of the craft during maneuvers, whereby the better characteristics of each of the gyroscopic references may be relied upon as the occasion demands. The complexities and costs of multiple gyroscopes obviously make this approach unattractive. In accordance with the present invention, however, it is recognized that measurement of craft motions may be characterized and resolved without resort to accessory gyroscopes. This involves special conversions and computations, which are based only upon data taken from about the usual gimbal axes of a multiple-gimballed platform, and which are readily performed by simple transducers and elementary computer apparatus.

Accordingly, it is one of the objects of the present invention to provide an improved gyroscopically-controlled flight reference system which develops data for precise craft control during maneuvers.

It is another object to provide a gyroscope system for indication and automatic piloting purposes wherein motions about aircraft axes are measured through unique conversions performed by simple computer apparatus.

A further object is to provide a novel and uncomplicated computer which operates upon measurements from a gyroscope reference to establish data which is reliable for craft control purposes during maneuvers.

By way of a summary account of practice of this invention in one of its aspects, a computer and indicator of special construction and mode of operation are associated with an aircraft navigational reference in the form of a three-gyro four-gimbal stable platform. A known navigational reference of this type possesses three principal gimbal axes which lie in a given relation to earth coordinates during level flight of the supporting aircraft, such that relative angular orientations of the gimbals may conveniently be taken to represent orientations of the craft itself in azimuth and elevation angle with respect to earth coordinates, and roll with respect to the horizontal. It is particularly important that craft movement during critical dive and climb maneuvers be correctly diagnosed, and yet it is at those very times that slight yawing motions will induce gimbal angles which indicate the craft roll with respect to the horizontal rather than indicating the result of actual roll motion of the craft about its fore-and-aft axis. This induced roll due to yaw alone may be combined with an actual true roll of the craft about its fore-and-aft axis to give a total roll of the craft with respect to the horizontal. This total roll gimbal information, if used directly to initiate control, would lead to faulty maneuvers of the craft. To avoid this, measurements of heading and elevation angle are fed to a computer in which preliminary computation is made of deviation in heading and in which computation provides basis for derivation of two separate functions which represent the sines of craft yaw and of apparent roll due to yaw. The total roll angle measurements from the gyroscope then have the calculated apparent roll subtracted from them to yield the true roll of the craft about its fore-and-aft axis, the true roll information being provided in forms suitable both for excitation of the indicator and for excitation of autopilot apparatus.

The subject matter regarded as our invention is particularly pointed out and distinctly claimed in the concluding portion of this specification. However, both as to preferred structure and assembly, and further in relation to objects and advantages thereof, this invention may best be understood through reference to the following description taken in connection with the accompanying drawings, wherein:

FIGURE 5 provides details in schematic and pictorial form, of a preferred embodiment of the invention in a navigational system.

Figure 1:
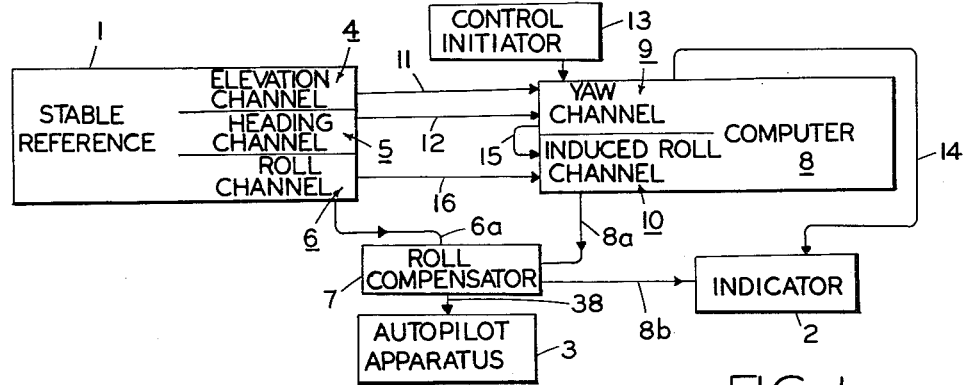
FIGURE 1 is a block-diagrammed representation of certain relationships between components of a navigational system in which this invention is embodied.

The system block-diagrammed in FIGURE 1 includes a stable reference 1, in the form of gyroscopic device in which gimbals interact in a manner analyzed later herein, coupled in controlling relationship to an indicator 2 and autopilot apparatus 3. Stable reference 1 includes three channels, 4, 5 and 6, in which output signals are developed to identify the conditions of craft heading, elevation angle, and total roll, respectively. In one preferred construction, the components in these channels may simply comprise the usual synchro transmitters which translate measurements of the appropriate gyro gimbal displacements into characterizing patterns of polyphase electrical output signals. For automatic control purposes, these output signals may be applied in known fashion as excitation for autopilot apparatus, one such arrangement for excitation of apparatus 3, including coupling 6a which delivers roll channel signals to the autopilot through a compensator 7. It will be understood that other autopilot excitations from other channels will ordinarily be provided also, although these are not specified in the drawing. Compensator 7 permits the roll signal excitations for the autopilot from stable reference 1 to be modified as needed during certain maneuvers, responsive to action of the computer 8 which functions to translate measurements into form optimum for the automatic piloting.

A cardinal purpose of computer 8 is to characterize the true roll of the supporting craft about its fore-and-aft axis at times when the measured total roll includes components induced by yaw motions of the craft. At such times the stable reference does not measure yaw directly, and it is incapable of directly signifying what portion of the measured total roll is caused by true roll about the fore-and-aft axis. Measurements of elevation angle include no such unknown component, however, nor do the measurements of instantaneous heading, and, based upon these data alone, computer 8 generates signals which accurately characterize the induced roll for a limited expected range of yawing movements. As a result of these computations, the yaw-induced component of the roll signal appears in coupling 8a and is subtracted from measured total roll, in compensator 7, such that the autopilot apparatus 3 witnesses only the difference signal representing the true roll which is of interest. In similar manner, a signal which is a function of true roll angle is developed for application over coupling 8b to indicator 2, which indicator displays roll information and may comprise the customary all-attitude indicator for the craft.

Computer 8 includes two principal computing sections. 9 and 10, which have been labelled "yaw" and "induced roll" channels, respectively. Input signals to yaw channel 9 include elevation angle measurements, applied through coupling 11, and heading (azimuth) measurements, applied through coupling 12. Based upon this input information, and further in response to a switching operation by control initiator 13, the yaw channel performs trigonometric conversions to compute two outputs. One output represents a sine function of the aircraft yaw during the maneuver, and this is applied to indicator 2 over coupling 14 such that the roll indications will be augmented by the yaw signals. In some aircraft, deviations in both roll and yaw are corrected by the same controls, and it can thus be advantageous to indicate both deviations without distinguishing between them. The other output, appearing in coupling 15, is of values which represent the yaw-induced roll. Channel 10 generates its induced roll output signals based upon this representation.

As thus far described, the navigational system is one arranged to develop reliable data for control of maneuvering craft through computations which advantageously involve simple trigonometric conversions. Moreover, the data upon which the computations are based are, with one exception, the usual output measurements from the gyroscopic reference. The exception involves data produced in a conversion of azimuth signals into signals which represent deviations in craft heading during the maneuver, the conversion being in response to a control initiation signal, from initiator 13, which may be in the form of a switch manually actuated at the beginning of a maneuver. Because of the special relationships selected as the basis for computations, it also becomes possible to neglect certain mathematical terms and thereby simplify the computation without impairing accuracy.

Figure 3:
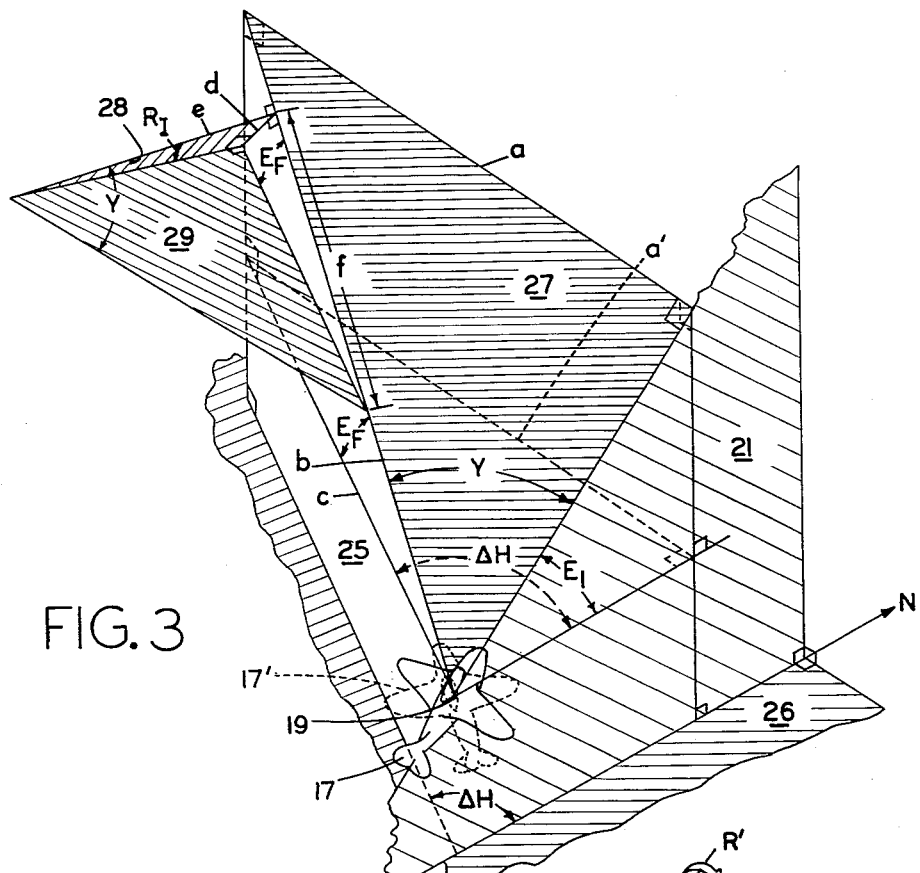
FIGURE 3 illustrates the instantaneous climb condition of the aircraft in FIGURE 2, together with a dashed-line outline of the craft simultaneously undergoing a pure yaw motion, against a background mathematical model which exhibits relationships important to the computations performed in practice of the invention.
Figure 2:
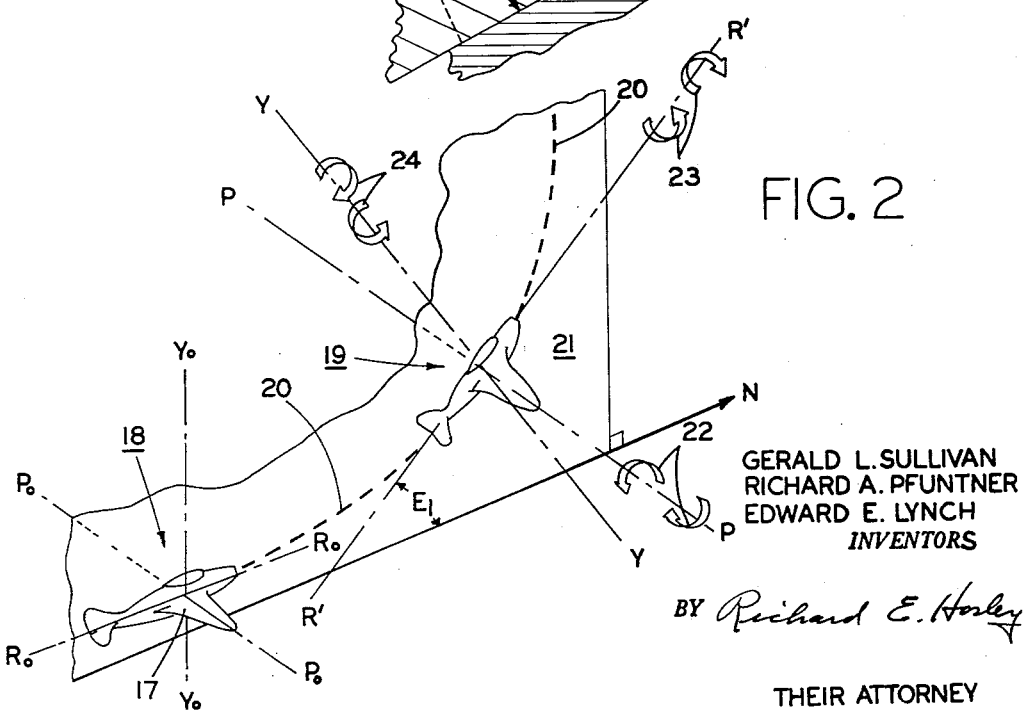
FIGURE 2 depicts sequential aircraft positions and orientations of craft axes along a maneuver course on which gyro gimbal relationships are to be translated into improved signals for craft control.

FIGURES 2 and 3 aid in understanding the basis for these computations, the illustrated maneuver being that of a climb such as is involved at commencement of a precision Immelmann turn. Aircraft 17 in FIGURE 2 is pictured both at a straight-and-level flight position 18 and a later climb position 19 along the dashed-line flight course 20. The illustrated course of climb, and heading of the craft, lie wholly in one vertical plane, 21, this being a course which is optimum for certain purposes. In the initial level flight orientation, 18, the aircraft fore-and-aft axis of roll $R_0$—$R_0$ and transverse pitch axis $P_0$—$P_0$ are both parallel with the earth and the yaw axis $Y_0$—$Y_0$ is perpendicular to both of them and to the earth's surface. A known form of gyroscopic apparatus having gimbal pivot and measurement axes coincident with these yaw, elevation angle and roll axes will provide measurements of the craft elevation angle movements as it proceeds to climb to position 19. In the latter position, the elevation angle axis orientation P—P remains parallel with the earth, hence the measured angular movements in elevation angle designated by arrows 22 must comprise true measurements of elevation angle of the craft in relation to the earth. Provided there is no yaw in the climb to position 19, a pure roll motion about the longitudinal axis results in measurements of craft true roll, although none is pictured, even though the roll axis at its orientation $R'$—$R'$ is no longer parallel with the earth. The angular roll movements designated by arrows 23 are then measured as true roll. However, any craft movements which occur in directions of arrows 24 about the yaw axis Y—Y when this axis is not perpendicular to the earth occasion gimbal interactions which also evidence themselves as movements about the roll axis; and the total roll movements thus include an induced roll component which is in addition to craft true roll, and which is not directly indicated.

In FIGURE 3, aircraft 17 is again portrayed at climb orientation 19 and, in a superimposed relationship, there is shown a dashed-line outline 17' of the same craft undergoing an instantaneous pure yaw motion. This yaw is unaccompanied by any actual roll of the craft about its longitudinal axis. However, it does cause the longitudinal axis of the craft to shift from the plane of its intended course, 21, to a different plane, 25, which, like plane 21, is also perpendicular to the horizontal plane of the earth, 26. The angle ΔH measured between the planes 21 and 25 on the earth, or parallel to it, represents the change which has taken place in azimuth heading of the craft as a consequence of the yaw. Yaw angle Y is different from, and obviously smaller than, this azimuth angle and can be identified only in the oblique plane 27 in which the longitudinal axis of the craft lies as the pure yaw motions is experienced. The gyroscope directional reference is of course incapable of expressing this yaw angle in any direct measurement. However, this gyroscopic reference does nevertheless provide measurements of azimuth heading angles which are valid during the maneuver because they are taken about a heading axis which is always vertical. These can be readily translated into change of heading angle, ΔH. Moreover, the same reference continues to yield measurements of true craft elevation angles during the maneuver, because elevation is measured about a gimbal axis which is always preserved horizontal. It will be observed that the counterclockwise pure yaw depicted in FIGURE 3 actually reduces the craft elevation angle from a value $E_I$, when the craft axis is aligned with the course plane 21, to a somewhat lower final elevation angle $E_F$, when the craft has yawed. The available data concerning change in heading angle, ΔH, and final elevation angle, $E_F$, become highly valuable when it is recognized that they can be related to a sine function of yaw angle, sin Y, as follows, having reference to the mathematic model in FIGURE 3:

$$\sin Y = \frac{a}{b}$$

$$\sin (\Delta H) = \frac{a'}{c}$$

$$a = a',$$

$$\frac{\sin Y}{\sin (\Delta H)} = \frac{c}{b} = \cos (E_F)$$

and $$\sin Y = \sin (\Delta H) \cos (E_F)$$

In a gyroscopic reference having gimbals angularly movable about a vertical heading axis, horizontal pitch (elevation angle) axis perpendicular to the heading axis, and roll axis aligned with the fore-and-aft axis of a supporting craft, it is impossible for the gyro gimbals to move to accommodate changes in both heading and elevation angle of the craft relative to the gimballed stable platform without at the same time undergoing relative angular movements about the roll axis. As used herein, the term "pitch" of course refers to elevation angle measured from the earth's horizontal surface to the fore-and-aft axis of the craft, in a plane vertical to the earth. The aforesaid relative movements about the roll axis occur even though no true roll is experienced, and the angular displacements of the gimbals "induced" solely because of the natural interactions of the gimbals are not actually representative of any roll which has taken place about the fore-and-aft axis of the craft. The present approach to identification of and adjustment for these induced roll displacements first recognizes that the gyro roll and elevation angle axes are fixed in mutually perpendicular relationship and that the angles measured about these axes should be shown geometrically in mutually perpendicular planes also. In addition, the craft yaw axis is, by definition, perpendicular to the roll axis, although not to the pitch or elevation angle axis. As a further mathematical aid to explanation of the invention, these planes are shown in FIGURE 3, the roll plane 28 being added in perpendicular relationship both to the final elevation plane 25 and to the plane of yaw 27, for the reasons mentioned. A plane 29 parallel to the earth is also introduced to permit certain trigonometric relationships to be calculated. The lines of intersection between the roll plane 28 and each of the yaw and earth planes 27 and 29 define an angle, $R_I$, which is then known to represent the unknown value of induced roll. The right triangles established in the mathematical model permit the following expressions to be stated:

$$\sin (R_I) = \frac{d}{e}$$

$$\tan (E_F) = \frac{d}{f}$$

and $$\tan Y = \frac{f}{e} = \frac{\sin (R_I)}{\tan (E_F)}$$

Therefore, $$\sin (R_I) = \tan Y \tan (E_F)$$

$$= \frac{\sin Y}{\cos Y} \times \frac{\sin (E_F)}{\cos (E_F)}$$

Sin Y had earlier been established as equal to sin $(\Delta H)$ cos $(E_F)$, such that the above expression may be rewritten:

$$\sin (R_I) = \frac{\sin (\Delta H) \cos (E_F)}{\cos Y} \times \frac{\sin (E_F)}{\cos (E_F)}$$

And, $$\sin (R_I) \cos Y = \sin (\Delta H) \sin (E_F)$$

These equations uniquely establish advantageous relationships between functions of the unknowns, yaw and induced roll, wholly in terms of sine and cosine functions of two quantities, one of which, $E_F$, can be measured directly, and the other of which, $\Delta H$, can be derived from direct measurements. The FIGURE 4 computer, which operates upon such measurements to produce outputs needed for control, is of particular advantage in that it lends itself to construction with simple components and servos of known design and miniaturized bulk. Input and output couplings are identified by the same reference characters appearing in the block diagram of FIGURE 1, and the symbols and mathematical functions referred to in the foregoing derivations are also conveniently applied to the couplings as aids to understanding of the computer operation. Azimuth angle input, H, appearing as polyphase synchro signals in coupling 12 are applied to a translator 30 which translates the electrical signals into mechanical angular displacements of an output shaft 31, the displacements being from a predetermined null position of the shaft and thus characterizing only the change in heading, $\Delta H$, which occurred since the translator was actuated into operation. This actuation is readily performed manually by the pilot when a precision maneuver is about to be executed. The mechanical characterization of the information $\Delta H$ is used to deflect the rotor of an electromechanical resolver 32 and, thereby, to develop a resolver output in coupling 33 which is a sine function of $\Delta H$. Resolver 32, and others useful elsewhere in the computer, may be of the known type having a stator and rotor assembly each including two windings in quadrature connected such that the two output windings deliver output signals proportional to an input signal multiplied by the sine and cosine, respectively, of the angle between the stator and rotor at any instant. In a like manner, the electrical input signal in coupling 11 representing the final elevation angle, $E_F$, of the craft at any instant is translated to a mechanical angular movement of coupling 34 by translator 35. Resolver 36 responds to the applied mechanical and electrical input signals by producing two electrical output signals which represent the two products of the electrical input signal with each of the sine and cosine functions of the mechanical input signal. Thus, the resolver output coupling 14 conveys electrical signals equal to sin $(\Delta H)$ cos $(E_F)$, which, have already been established as being equal to the sine of the yaw angle. For the expected small angles of yaw in contemplated maneuvers, the sine function is in substantially linear relation to the actual yaw angle, and the sin Y output is taken to represent yaw.

The other output signal from resolver 36, appearing in coupling 37 is equal to sin $(\Delta H)$ sin $(E_F)$. Computation earlier herein has established that this is equal to sin $(R_I)$ cos Y. Inasmuch as the expected yaw angles are relatively small, their cosine functions are of substantially unity value and are purposely neglected here, and the output at 37 is taken to represent the sine function of the induced roll angle $R_I$. Identification of this angle, $R_I$, is of course a principal objective.

It is not induced roll, $R_I$, which is meaningful to either the pilot or automatic pilot, but the true craft roll, R. This is known to be equal to the measured total roll, $R_T$, less the induced roll, $R_I$. The computer derives this true roll data in two advantageous forms: as a signal in coupling 38 linearly related to true roll angle, for autopilot actuating; and as a signal in coupling 8b which is a sine function of the true roll angle, the latter form of signal being desirable for actuation of an indicator. True roll signal R and its sine function sin R are conveniently produced as the electrical outputs of a common form of differential synchro, 39, and control transformer, 40, respectively, when their movable rotors are angularly oriented by mechanical signals representing induced roll, $R_I$. These mechanical signals are applied to units 39 and 40 by a coupling 41 which is common to both units and to the rotor of a further resolver 42. The mechanical signals are generated as the output of a translator 43. Preferably, this translator comprises a simple servo amplifier and servo motor of known constructions which respond to electrical difference signals between the output of resolver 36 and the sine function output of the resolver 42. The coupling 41 continuously adjusts resolver 42 to deliver electrical outputs at 44 exactly counterbalancing the sin ($R_I$) signals at 37, whereupon the angular orientations of coupling 41 are caused to represent the induced roll, $R_I$, as sought.

Figure 4:
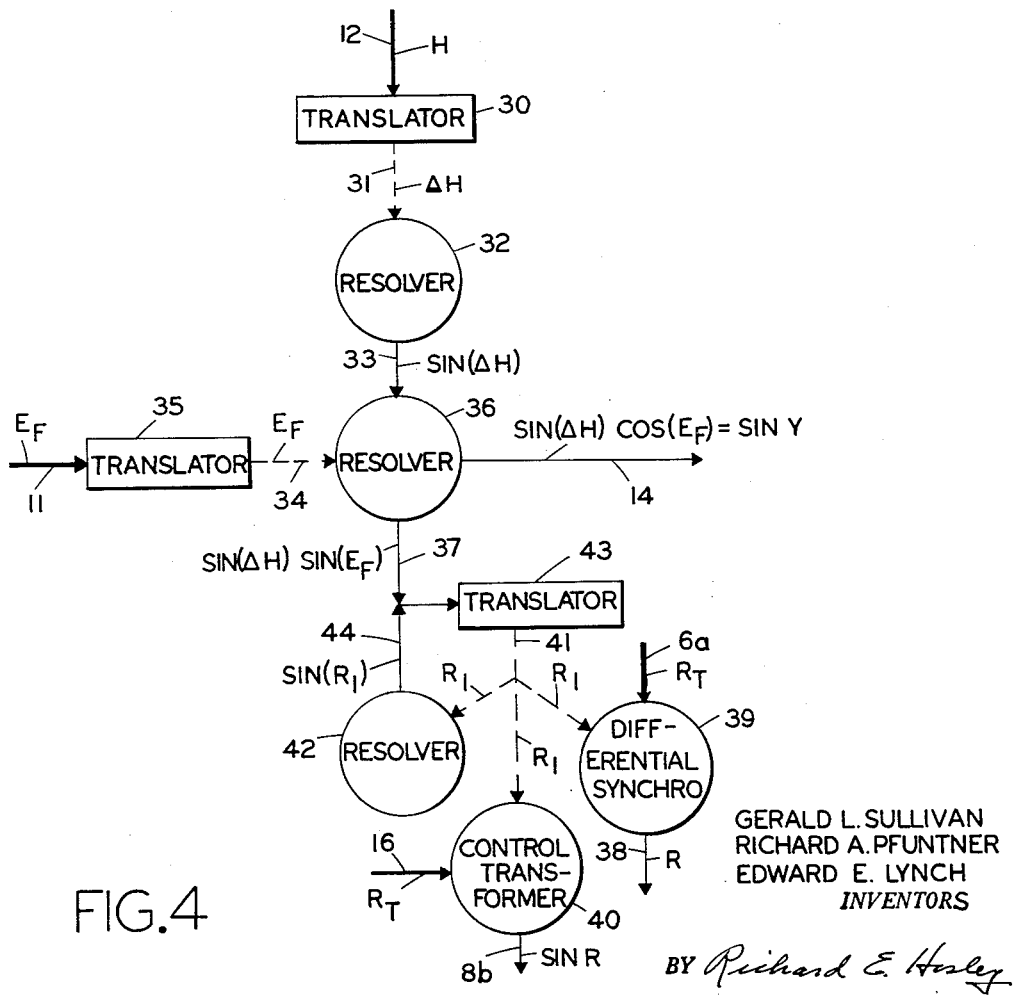
FIGURE 4 is a block diagram of a computer for resolving the information characterized in the mathematical model of FIGURE 3.

FIGURE 5 displays details of a system such as that of FIGURE 1 and of a computer such as is shown in FIGURE 4, and therefore the corresponding elements are designated by the same reference characters, as a convenience in the description. Stable reference device 1 is illustrated as a gyroscopic device having an inner stable platform 45 which mounts three single-axis gyros 46, 47 and 48 each primarily sensitive to craft motions about a different axis. In known manner, the platform is pivotally suspended in craft framework 17a, about its longitudinal roll axis R'—R', through three intermediate gimbals 49, 50 and 51. Gimbals 49 and 50 are servo-actuated to the illustrated 90° relationship, and the platform is stabilized in relation to the vertical, by suitable accessory apparatus which is not shown, and it should of course be understood that the illustration iso nly schematic in respects not critical to an understanding of this invention. Three synchro transmitters, 52, 53 and 54, measure the angular relationships between the relatively movable gimbals and translate the measurements into polyphase electrical signals intended to characterize azimuth heading, elevation angle, and roll, respectively, of the aircraft. However, as has already been explained, the supporting aircraft performs maneuvers in relation to the stable platform 45, and the aircraft's coordinates do not coincide with the axes established by the platform except in level flight. While the gimbals isolate the stable platform from motion of the aircraft, they nevertheless interact to develop certain "induced" relative gimbal movements which prevent the coordinates of measurement from remaining fixed in relation to the craft. This was the effect in the earlier-mentioned case of the induced roll occurring with yaw during a climb or dive.

FIGURE 5 shows a preferred form of the translator 30 to include a control transformer 55, servo amplifier 56, servo motor 57, feedback generator 58, and clutch 59. In a known manner, the polyphase azimuth signals applied to control transformer stator 60 develop output signals in rotor winding 61 signifying any failure of the rotor winding to move in angular synchronism with the rotor of azimuth synchro 52. These output signals excite phase-sensitive servo amplifier 56 to energize servo motor 57 in proper sense to drive the output shaft 62 in the desired synchronous relationship, such that its angular orientations characterize the azimuth headings of the craft. Although it is not shown, the shaft 62 may be coupled to a movable azimuth indicator to afford a visual display of azimuth headings. Generator 58 provides the usual stabilizing feedback. Electromagnetically-actuated clutch 59 is interposed between shaft 62, the angular positions of which represent azimuth heading, and the shaft 31 which is to characterize only the change in heading, $\Delta H$. Normally, the shaft 31 is urged to a predetermined null position, by conventional biasing means not appearing in the illustration, such that there is no electrical output signal developed by the connected resolver 32. However, clutch 59 becomes engaged instantly in response to actuation of a control initiator 13 in the form of a simple electrical switch closed by a push-button 63. This clutching may conveniently be initiated by the pilot as a maneuver is about to begin, although the control initiation may also be made automatic or intermittent. The result of the clutching is to establish that shaft 31 moves only through an angle $\Delta H$ representing the change in azimuth heading which has occurred since the instant of clutching. This angle, rather than instantaneous heading, is what is required as the basis for computations which will identify true yaw and true roll, as has already been discussed.

Translator 35 is similar to translator 30, in that it includes a servo-driven control transformer 64, servo amplifier 65, servo motor 66, and feedback generator 67, all arranged to position the output coupling 34 in instantaneous angular synchronism with elevation angles sensed about elevation angle axis P—P by elevation angle axis transmitter synchro 53. No disengageable clutching mechanism is employed with translator 35, although a clutch 68 similar to clutch 59 is also preferably employed between the translator 43 and its output shaft 41. Clutching is desirable in the latter case when, as shown, the output shaft 41 is also used to adjust the rotor of a differential synchro 39 intermediate the autopilot and the roll axis transmitter synchro 54. Under normal level flight conditions, the shaft 41 should be in a predetermined null angular position, else the autopilot is fed false roll information, and the shaft should be disengageable from the translator servo motor 69 such that conventional biasing means (not appearing in the schematic diagram) can preserve it at the null position. Clutch 68 is engaged by a push-button 63', which may be combined with push-button 63, at the beginning of a maneuver to enable the differential synchro 39 to be continuously adjusted in the earlier-described manner which removes unwanted induced roll information from the autopilot input. The translator servo amplifier 70 drives the servo motor 69 and feedback generator 71 responsive to differences between the sin ($R_I$) signals in the outputs of resolvers 36 and 42, thereby characterizing the amount of induced roll in the angular deflections of shaft 41. Rotor winding 72 of control transformer 40 is adjusted by shaft 41 to have signals induced therein which are caused to represent the sine function of the true roll as a consequence of excitation of the polyphase stator 73 by the roll axis synchro transmitter 54.

Each of resolvers 32, 36 and 42 is illustrated schematically as including two pairs of windings in quadrature arranged about a central rotor element, although it will be understood that a suitable design in practice more closely resembles that of an induction motor with one set of windings fixed for rotation with the rotor. Separate alternating current excitation terminals 74 and 75 are shown as inputs to resolvers 32 and 42, respectively, while the corresponding input excitation of resolver 36 is with the sin ($\Delta H$) output of resolver 32 appearing in coupling 33.

Servo actuation of a roll-indicating member 76 of the indicator 2 is readily achieved by way of a servo motor 77 energized by a servo amplifier 78. When there is neither a sine of yaw nor sine of roll signal in output leads 14 and 86, respectively, the compared output of rotor winding 79 of control transformer 80 should also be a null value, such that the servo amplifier will witness no difference signal. At such times, the servo motor 77 orients the indicator 76 to a null position signifying there is no roll or yaw. When there is either or both of roll or yaw, the characterizing signals in couplings 14 and 86 are compared with the output of rotor winding 79 to produce a servoed actuation of the rotor winding which results in a balanced condition. Indicator 76 then provides a visible display that roll or yaw has occurred, and to what extent. For these purposes, the polyphase input to stator 81 of control transformer 80 are of fixed value, although at times other than those of maneuvers the input may be switched to comprise that from roll axis synchro 54. In the latter event, the indicator 2 affords roll indications of the customary type. Where the yaw signal output of resolver 36 is to provide the basis for automatic piloting control, as has been explained in connection with the roll signals, a suitable translator 82 along the lines of the servo units described may be used to convert the sine of yaw signals into polyphase output at 83 suitable for application to a yaw control channel of autopilot apparatus 3.

In the preceding description it has been convenient and proper to neglect the fact that certain output signals are obviously subject ot influence by other variables, which are actually not material to the invention itself. By way of example, the outputs of resolvers 32 and 42 in FIGURE 5 will have proportionality to the input signals applied to their terminals 74 and 75, respectively, although the effects thereof are readily eliminated in practice by preserving the inputs at desired fixed levels or by attenuating the outputs to remove unwanted proportionalities. The stable reference device 1 may of course support certain of the resolver and translator elements on its gimbals rather than separately and remotely. In the case of resolver 36, for example, the pitch angle actuations thereof may be produced by mounting its stator and rotor on different ones of gimbals 50 and 51 about axis P—P, thereby obviating need for translator 35. Inner gimbal, or platform, 45 of the stable reference 1 need not resemble the illustrated flat platform, and the illustrated arrangement of gyroscopes thereon may also be changed in known ways while yet producing a reference device having characteristics like those described. Further, those skilled in the art will recognize that known gimbal-reversing accessories are a desirable part of the stable reference device 1, for the purpose of avoiding gimbal lock difficulties, although in interests of simplification these have not been shown and discussed in detail. The transient 180 degree reversal which takes place in orientation of roll gimbal 51 as gimbal lock is avoided in vertical flight is of course preferably accomplished while the controls dependent upon roll axis measurements are made insensitive to the rapid gimbal reversal.

As has been shown, the induced roll angle is computed through reference to the sine function of the angle. Mathematically, a given polarity and numerical value of a sine function can define two different angles, and it is only when knowledge is had of the polarity of slope of sine of an angle that it can be distinguished from its counterpart having the same sine. However, it may be further shown that, in the apparatus here considered, a given polarity of small yaw angle will result in a rate of change (slope) of sine of induced roll which is of one polarity for rightside-up craft attitudes and is of a reverse polarity for all upside-down craft attitudes. In adition, position of the outer roll gimbal with respect to the outer frame will conveniently signify whether the aircraft is rightside-up or upside-down. Such information is sufficient to initiate signal reversals which assure unique and proper computations of induced roll angles, and, in a convenient adaptation of this invention, the signal reversals are initiated by switches activated by the roll gimbal of the stable reference. In the FIGURE 5 apparatus, for example, a simple reversing switch between gimbal 51 and frame 17a will produce the intended result by initiating reversal of excitations of servo motor 69 and generator 71. Such provisions are not required where the craft is not expected to become inverted to upside-down positions. Similar techniques can be applied in the computation of aircraft yaw.

Accordingly, it should be apparent that the specific embodiments of this invention disclosed herein are intended to be of a descriptive rather than a limiting nature and that various changes, combinations, substitutions and modifications may be introduced in practice of these teachings without departing in spirit or scope from this invention in its broader aspects.

What we claim as new and desire to secure by Letters Patent of the United States is:

1. A navigational reference comprising a stabilized platform suspended for mounting on a supporting craft in a suspension having parts relatively movable angularly about a vertical heading axis, a horizontal pitch axis perpendicular to the heading axis, and a roll axis aligned with the fore-and-aft axis of the craft, means for translating the angular relationship between a part of said suspension and a specified heading of interest into a deviation signal proportional to said angular relationship, and resolver means responsive both to said deviation signal and to angular relationships between the parts of said suspension about said pitch axis producing output signals characterizing effects of yaw occurring during maneuvers of said craft.

2. A navigational reference comprising a stabilized platform suspended for mounting on a supporting craft in gimbals angularly movable about a vertical heading axis, a horizontal pitch axis perpendicular to said heading axis, and a roll axis aligned with the fore-and-aft axis of the craft, means for generating an electrical signal characterizing azimuth heading about said heading axis, means for translating said electrical azimuth heading signal into a mechanical deviation signal proportional to deviation from a specified heading of interest, and resolver means responsive both to said mechanical deviation signal and to signals commensurate with gimbal angles about said pitch axis producing output signals characterizing yaw and the gimbal angles about said roll axis induced by yaw during maneuvers of said craft.

3. A navigational reference comprising a stabilized platform suspended for mounting on a supporting craft in gimbals angularly movable about a vertical heading axis, a horizontal pitch axis, perpendicular to the heading axis, and a roll axis aligned with the fore-and-aft axis of the craft, means generating electrical signals characterizing measurements about each of said axes, actuatable means for translating the electrical measurement signals from about said heading axis into mechanical movements proportional to deviation in heading occurring after actuation of said translating means, a first resolver actuated by said mechanical movements to produce an electrical output proportional to a sine function of said deviation in heading, means for translating the electrical measurement signals from about said pitch axis into mechanical movements proportional to instantaneous pitch, a second resolver actuated by said mechanical movements proportional to instantaneous pitch and by said electrical output proportional to said sine function to produce electrical output signals characterizing the sine function of effects of yaw occurring during maneuvers of said craft.

4. A navigational reference comprising a gyroscopically stabilized platform suspended for mounting on a supporting craft in gimbals angularly movable about a vertical heading axis, a horizontal pitch axis perpendicular to the heading axis, and a roll axis aligned with the fore-and-aft axis of the craft, means for translating a gimbal angle into a heading deviation signal proportional to deviation from a specified heading of interest, first resolver means for converting said heading deviation signal into a signal proportional to the sine function thereof, second resolver means converting said sine function signal and signals commensurate with gimbal angles about said pitch axis into two output signals, one of said output signals being equal to the product of said sine function and the cosine of said pitch axis gimbal angles, and the other of said output signals being equal to the product of said sine function and the sine function of said pitch axis gimbal angles.

5. A navigational reference comprising a gyroscopically stabilized platform suspended for mounting on a supporting craft in gimbals angularly movable about a vertical heading axis, a horizontal pitch axis perpendicular to the heading axis, and a roll axis aligned with the fore-and-aft axis of the craft, normally-inactive means for translating gimbal angles about said heading axis into heading deviation signals proportional to deviations in heading occurring after actuation thereof, means for actuating said translating means upon commencement of a maneuver of said craft that involves a change in heading, first resolver means converting said heading deviation signals into signals proportional to the sine function thereof, second resolver means converting said sine function signals and signals commensurate with gimbal angles about said pitch axis into two output signals, one of said output signals being proportional to the product of said sine function and the cosine of said pitch axis gimbal angles, and the other of said output signals being proportional to the product of said sine function and the sine function of said pitch axis gimbal angles, whereby said one output signal characterizes yaw as a sine function thereof and said other output signal characterizes the sine function of gimbal angles about said roll axis which are induced by yaw during said maneuver, and signal utilization means responsive to output signals from said second resolver.

6. A navigational reference as set forth in claim 5 wherein said translating means comprises a rotatable shaft, servo means continuously orienting said shaft to positions of angular correspondence with azimith headings of said platform about said heading axis, and normally de-energized electromagnetic clutch means for coupling said shaft in driving relationship to the rotor of said first resolver means when energized and wherein said actuating means comprises a manually-operated electrical switch for making electrical connection for energizing said clutch means.

7. A navigational reference comprising a gyroscopically stabilized platform suspended for mounting on a supporting craft in gimbals angularly movable about a vertical heading axis, a horizontal pitch axis perpendicular to the heading axis, and a roll axis aligned with the fore-and-aft axis of the craft, normally-inactive means for translating gimbal angles about said heading axis into heading deviation signals proportional to deviations in heading occurring after actuation thereof, means for actuating said translating means upon commencement of a maneuver of said craft that involves a change in heading, first resolver means converting said heading deviation signals into signals proportional to the sine function thereof, second resolver means converting said sine function signals and signals commensurate with gimbal angles about said pitch axis into output signals proportional to the product of said sine function and sine function of said pitch axis gimbal angles, whereby said output signals characterize the sine function of gimbal angles about said roll axis which are induced by yaw during said maneuver, means translating said last named sine function signals into induced roll signals proportional to said roll axis gimbal angles which are induced by yaw, signal utilization means for operation according to true roll of said craft about said fore-and-aft axis, means applying as input to said signal utilization means signals characterizing gimbal angles about said roll axis less said induced roll signals from said last-named translating means.

8. A navigational reference as set forth in claim 7 wherein said last-named translating means comprises a rotatable shaft, third resolver means having the rotor thereof oriented by said shaft, and servo means responsive to differences between said last-named sine function signals and the sine function output signals from said third resolver means actuating said shaft to positions at which said differences are eliminated, whereby angular movements of said shaft during said maneuver characterize the components of roll axis gimbal angles which are induced by yaw.

9. A navigational reference comprising a gyroscopically stabilized platform suspended for mounting on a supporting craft in gimbals angularly movable about a vertical heading axis, a horizontal pitch axis perpendicular to the heading axis, and a roll axis aligned with the fore-and-aft axis of the craft, normally-inactive means for translating gimbal angles about the heading axis into heading deviation signals proportional to deviations in heading occurring after actuation thereof, means for actuating said translating means upon commencement of a maneuver of said craft that involves a change in heading, first resolver means converting said heading deviation signals into signals proportional to the sine function thereor, second resolver means converting said sine function signals and the signals commensurate with gimbal angles about said pitch axis into two output signals, one of said output signals being proportional to the product of said sine function signals and the cosine of said pitch axis gimbal angles, and the other of said output signals being proportional to the product of said sine function and the sine function of said pitch axis gimbal angles, means translating said other output signals into induced roll signals proportional to gimbal angles about said roll axis which are induced by yaw, means responsive to said induced roll signals and to the signals commensurate with gimbal angles about said roll axis producing signals which are a function of true roll of the craft about said fore-and-aft axis, an indicator for visually displaying roll conditions of said craft, and means for actuating said indicator in accordance with both said one output signal and said signal which is a function of said true roll.

10. In a navigational reference having a stabilized platform gimballed in a supporting craft with freedom for relative movement about a vertical heading axis, a horizontal pitch axis perpendicular to the heading axis, and a roll axis aligned with the fore-and-aft axis of the craft, and having electrical signal generating means which characterize measurements about each of said axes of relative movement, the apparatus for characterizing effects of yaw during craft maneuvers comprising actuatable means for translating the electrical measurement signals from about said heading axis into mechanical movements proportional to deviation in heading occurring after actuation of said translating means, a first resolver actuated by said mechanical movements to produce an electrical output proportional to a sine function of said deviations in heading, means for translating the electrical measurement signals from about said pitch axis into mechanical movements proportional to instantaneous pitch, and a second resolver actuated by said mechanical movements proportional to pitch and by said electrical output proportional to said sine function to produce two electrical output signals characterizing the sine function of yaw and the sine function of gimbal angles about said roll axis which are induced by yaw, respectively.

11. A navigational reference comprising a gyroscopically stabilized platform suspended for mounting on a supporting craft in gimbals angularly movable about a vertical heading axis, a horizontal pitch axis perpendicular to the heading axis, and a roll axis aligned with the fore-and-aft axis of the craft, normally-inactive means for translating gimbal angles about the heading axis into heading deviation signals proportional to deviations in heading occurring after actuation thereof, means for actuating said translating means upon commencement of a maneuver of said craft that involves a change in heading, first resolver means converting said heading deviation signals into signals proportional to the sine function thereof, second resolver means converting said sine function signals and signals commensurate with gimabl angles about said pitch axis into output signals proportional to the product of said sine function and sine function of said pitch axis gimbal angles, whereby said output signals characterize the sine function of gimbal angles about said roll axis which are induced by yaw during said maneuver, means translating said last-named sine function signals into mechanical signals proportional to gimbal angles about said roll axis which are induced by yaw, automatic piloting apparatus for controlling roll of said craft responsive to input signals applied thereto, a differential synchro, a synchro transmitter measuring the gimbal angles about the roll axis and applying characterizing signals as input to said differential synchro, means for angularly adjusting said differential synchro responsive to said mechanical signals, and means applying the output signals from said differential synchro to said automatic piloting apparatus.

References Cited in the file of this patent

UNITED STATES PATENTS 2,752,793     Draper et al. ------------ July 3, 1956